April 9, 1935.  P. J. FITZGERALD  1,996,957
SLICING AND SHREDDING DEVICE
Filed March 29, 1933   2 Sheets-Sheet 2
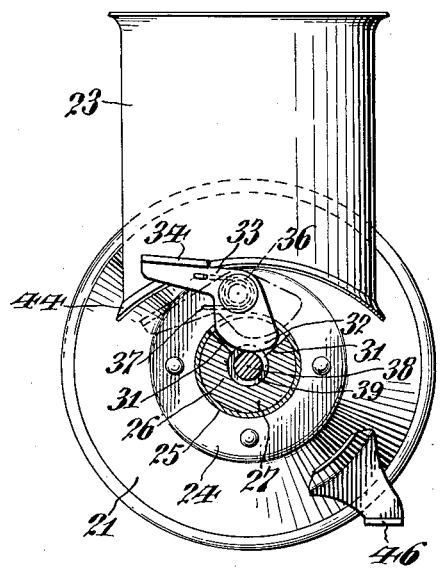
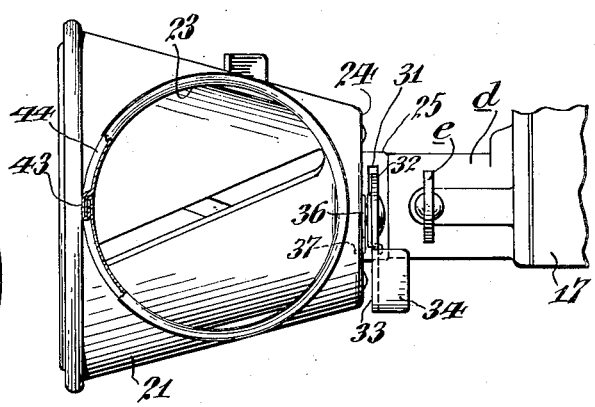
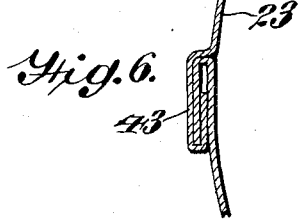
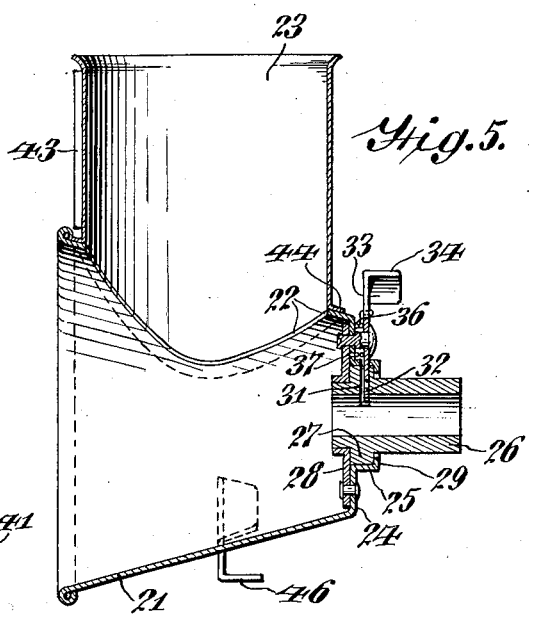
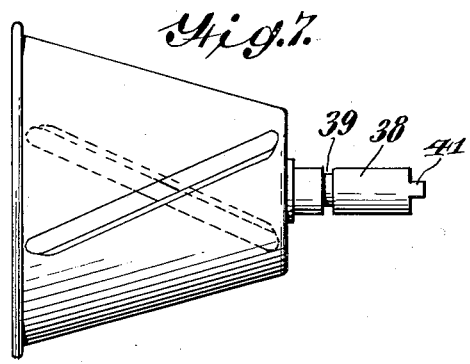
Inventor
Patrick J. Fitzgerald,
By Joshua R. H. Potts
Attorney

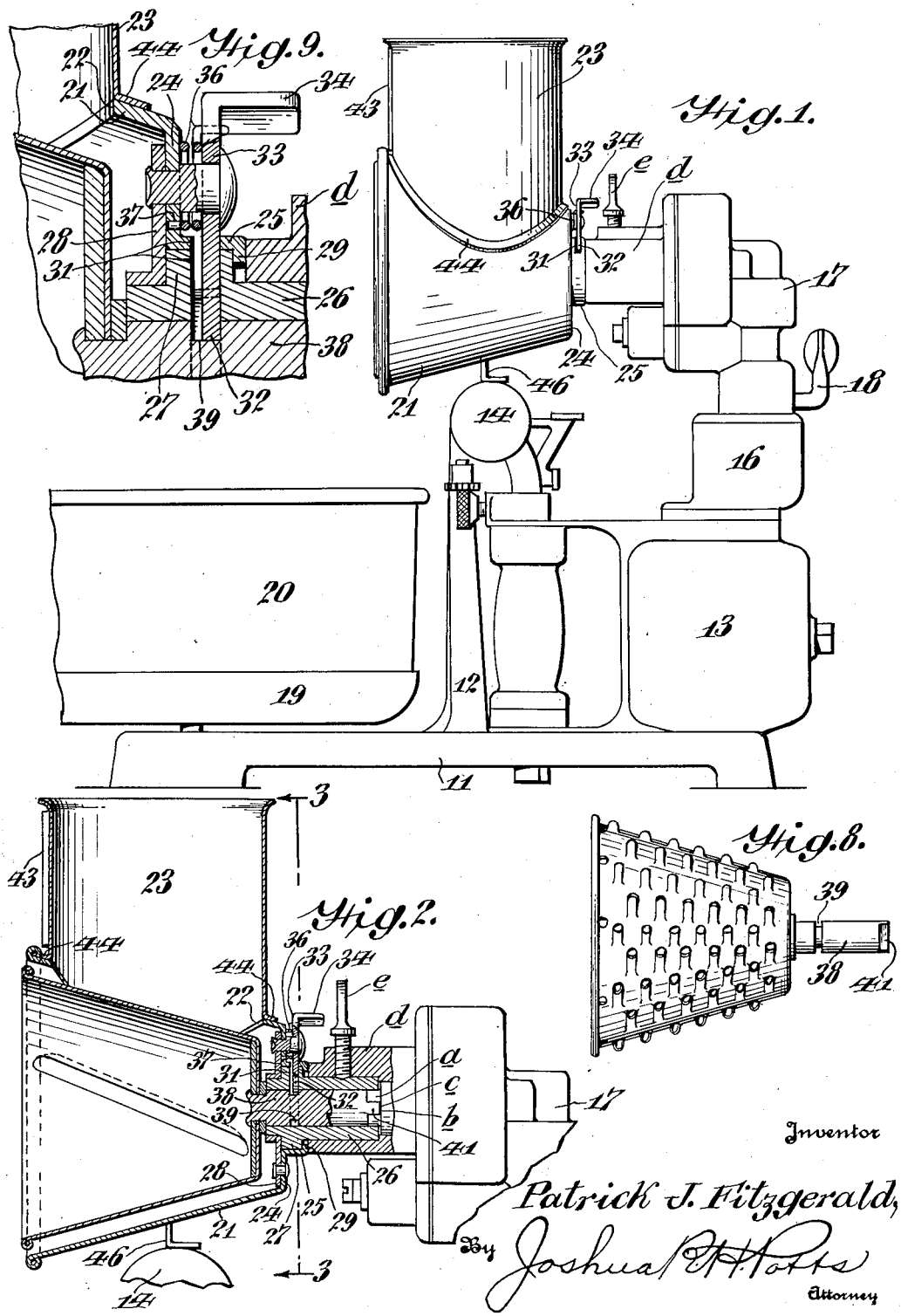

UNITED STATES PATENT OFFICE 1,996,957

SLICING AND SHREDDING DEVICE

Patrick J. Fitzgerald, Torrington, Conn., assignor to The Fitzgerald Mfg. Company, Torrington, Conn., a corporation of Connecticut Application March 29, 1933, Serial No. 663,268

9 Claims. (Cl. 287—1)

This invention relates to a slicing and shredding device, and particularly to such a device as may be connected to a power unit for operating interchangeable implements used in the same.

In my United States application for Letters Patent, entitled "Electrical utility device", filed April 12, 1932, Serial No. 604,834, there is shown and described a mixing and extracting machine, while in my application for United States Letters Patent, entitled "Power adapter", filed December 6, 1932, Serial No. 645,928, there is shown and described a mechanism associated with the electrical utility device for providing a two-speed unit adapted for the connection and driving of various implements for household use.

The subject-matter of this invention comprises a device or implement capable of attachment to the mechanisms above described, and is for the purpose of slicing and shredding vegetables, fruits, etc.

This application is an improvement on my application filed December 6, 1932, Serial No. 645,929, and designated "Slicing and shredding device".

The object of the present invention is to provide an improved slicing and shredding device capable of attachment to a power unit for supporting the casing thereof in driving the working implements.

A further object of the invention is to provide a slicing and shredding device which can be manufactured at small expense and which will provide all the advantages of devices constructed of heavier material and at great expense.

According to the invention the slicing and shredding device comprises a drawn metal casing, frustro-conical in shape, and is provided at its inner end with a sleeve for attachment to a power unit, a working implement of substantially the same shape as the casing, and adapted to rotate in said casing by means of a shaft extending through a casing sleeve, and having means on the end thereof for coupling the said shaft to a power take-off unit in the power adapter.

The drawings illustrate an embodiment of the invention and the views therein are as follows:

Figure 1 is a side elevation of the electrical utility device showing the power adapter incorporated therewith and the subject-matter of this invention operatively connected thereto.

Figure 2 is a vertical sectional view of the slicing and shredding device showing a portion of the adapter in section, Figure 3 is a cross-sectional view taken on the line 3—3 of Figure 2 and looking in the direction of the arrows.

Figure 4 is a top plan view of the slicing and shredding device showing a portion of the power adapter, Figure 5 is a vertical sectional view of the casing of the slicing and shredding device, Figure 6 is a fragmentary longitudinal sectional view showing the manner in which the hopper is seamed, Figure 7 is a side elevation of the cutting implement, Figure 8 is a side elevation of the shredding implement, and Figure 9 is an enlarged fragmentary vertical sectional view showing the latch and adjacent parts.

As shown in Figure 1 the electrical utility device comprises a base 11 having a standard 12 and a motor 13 pivotally mounted on the standard at 14. The motor is provided with a gear box 16 and the power adapter 17 is connected therewith through the operation of the latch 18. These mechanisms and parts are all described in the applications aforementioned.

In the application of the power adapter there is described a pair of power take-off members having different speeds and a portion of which is shown in Figure 2 and identified by the characteristic a. This take-off member is in the form of a shaft b having its end slotted at c. Surrounding this take-off member is a collar d provided at its upper end with a winged screw e, the purpose of which will be later explained.

The electrical utility device is also provided with a turntable 19 for supporting a bowl or vessel 20 and while that particular arrangement forms part of the equipment for the machine when used as a mixing device, it may be utilized for receiving the sliced and shredded material which is discharged from the slicing and shredding device.

The slicing and shredding device comprises a casing 21 whose interior is frusto-conical shape, and provided with a cut-out portion 22 which communicates with the feed magazine or hopper 23. This casing is made of a drawn metal shell and its inner reduced end is flanged as at 24 and this flange terminates in an extension 25 which embraces a hub or sleeve 26.

This hub 26 has an annular shoulder 27 and the inside of the flange 24 is engaged by a circular plate 28 which is riveted to the flange 24. The annular extension 25 is bent inwardly at 29 to engage the other side of the shoulder 27.

A vertical slot 31 extends down through the extension 25 and the shoulder 27 for the reception of a tongue 32 of a latch 33 which is operated by a thumb piece 34. Said latch is pivotally mounted by a shouldered rivet which extends through the flange 24 and plate 28. The latch is provided with a spring 36, one end of which is secured to the same near the thumb piece 34, and the other end of which extends into a hole 37 in the annular flange 24 of the casing, so as to urge the tongue 32 of the latch 33 through said slot 31 when pressure is released from the thumb piece 34.

The cutting implements shown in Figures 7 and 8 are, respectively, for the purposes of slicing and shredding and are the same as shown in my former application, Serial No. 645,929, above referred to.

These implements are each provided with a shaft 38 having an annular groove 39 and one of these shafts is adapted to fit within the hub or sleeve 26 of the casing, and when the rib 41 on the end of the same engages the power take-off member by fitting within the groove c, the said groove 39 will be directly in line with the slot 31 so that as pressure on the thumb piece 34 is withdrawn, the spring 36 will act to throw the tongue of the latch into the groove 39 and thus secure the implement in the casing.

The hopper 23 is blanked and shaped from sheet metal and its edges are double seamed, as at 43 in Figure 6. Its lower edge is flanged, as at 44, and of such contour as to fit the edges of the cut-out portion 22 of the casing and the said flange is brazed to said casing.

The casing is provided with a foot or rest 46 which is brazed thereon and which is adapted to rest upon the standard of the utility device, as shown in Figure 1.

Of course, the cutting and shredding device illustrated may be modified and changed in various ways without departing from the invention herein set forth and hereafter claimed.

I claim:—

1. A slicing and shredding device, comprising a casing having its body drawn to frustro conical shape and terminating at its reduced end in an annular turned in flange, an extension on said flange, a sleeve having a shoulder, said shoulder engaging said extension, a plate secured to the inside of the flange and against said shoulder for securing said sleeve to said casing, an implement having a shaft extending through said sleeve, an arcuate slot extending through said extension and said sleeve, an annular groove in said shaft, and a latch pivoted to said flange and having its free end movable through the slot to engage the groove in said shaft for removably holding the implement therein.

2. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, and a flange inturned from the cylindrical part engaging against the shoulder.

3. A device for attachment to a household power unit embodying a power-take-off shaft, of a sleeve adapted to embrace the power take-off shaft in part, said sleeve having an annular shoulder, a casing having an annular end fitting about the shoulder, a cylindrical offset from said annular end embracing said shoulder, and a flange inturned from the cylindrical part engaging against the shoulder, said unit having a shoulder against which said flange abuts.

4. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, a flange inturned from the cylindrical part engaging against the shoulder, said unit having a shoulder against which said flange abuts, and means to lock said sleeve removably in such engagement.

5. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, a flange inturned from the cylindrical part engaging against the shoulder, and a washer permanently secured to the annular part of the casing in engagement with the side of the shoulder opposite said flange.

6. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, a flange inturned from the cylindrical part engaging against the shoulder, and a washer permanently secured to the annular part of the casing in engagement with the side of the shoulder opposite said flange, said washer having a cylindrical offset embracing said sleeve.

7. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, a flange inturned from the cylindrical part engaging against the shoulder, said unit having a shoulder against which said flange abuts, and a washer permanently secured to the annular part of the casing in engagement with the side of the shoulder opposite said flange.

8. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, a flange inturned from the cylindrical part engaging against the shoulder, said unit having a shoulder against which said flange abuts, means to lock said sleeve removably in such engagement, and a washer permanently secured to the annular part of the casing in engagement with the side of the shoulder opposite said flange.

9. A device for attachment to a household power unit embodying a power take-off shaft, of a sleeve adapted to embrace the power take-off shaft in part, said sleeve having an annular shoulder, a casing having an annular end fitting about the shoulder, a cylindrical offset from said annular end embracing said shoulder, a flange inturned from the cylindrical part engaging against the shoulder, said unit having a shoulder against which said flange abuts, means to lock said sleeve removably in such engagement, and a washer permanently secured to the annular part of the casing in engagement with the side of the shoulder opposite said flange, said washer having a cylindrical offset embracing said sleeve.

PATRICK J. FITZGERALD.